United States Patent [19]

Yon

[11] Patent Number: 5,650,004
[45] Date of Patent: Jul. 22, 1997

[54] CEMENT PLASTER COMPOSITION, ADDITIVE THEREFOR AND METHOD OF USING THE COMPOSITION

[76] Inventor: Michael D. Yon, 2315 Charlotte Dr., Charlotte, N.C. 28203

[21] Appl. No.: 492,897

[22] Filed: Jun. 20, 1995

[51] Int. Cl.⁶ .................... C04B 14/04; C04B 14/08; C04B 14/10; C04B 14/28
[52] U.S. Cl. .................... 106/719; 106/721; 106/724; 106/727; 106/737; 106/738; 106/794; 106/796; 106/803; 106/806; 106/808; 106/811; 106/812; 106/817; 106/819; 106/823; 106/DIG. 4; 427/427
[58] Field of Search .................... 106/718, 719, 106/721, 724, 709, 708, 706, 737, 738, 803, 812, 817, 819, DIG. 4, 823, 794, 796, 806, 727, 795, 799, 811, 808; 427/427

[56] References Cited

U.S. PATENT DOCUMENTS

| 3,042,535 | 7/1962 | Hiltrop et al. | 106/817 |
|---|---|---|---|
| 4,036,658 | 7/1977 | Puhringer et al. | 106/817 |
| 4,198,472 | 4/1980 | Brown | 106/738 |
| 4,256,501 | 3/1981 | Banino | 106/719 |
| 4,329,178 | 5/1982 | Kalvenes et al. | 106/719 |
| 4,394,335 | 7/1983 | Roth et al. | |
| 4,395,289 | 7/1983 | Balakirev et al. | 106/719 |
| 4,398,960 | 8/1983 | Murray | 106/738 |
| 4,428,775 | 1/1984 | Johnson et al. | 106/719 |
| 4,430,463 | 2/1984 | Mullenax | 524/5 |
| 4,514,947 | 5/1985 | Grail | 524/5 |
| 4,607,066 | 8/1986 | Barry et al. | 166/294 |
| 4,708,745 | 11/1987 | Schonhausen | 106/718 |
| 4,861,378 | 8/1989 | Watanabe et al. | 106/719 |
| 4,975,122 | 12/1990 | Parkinson et al. | 106/806 |
| 5,098,612 | 3/1992 | Rowsell | 106/719 |
| 5,271,974 | 12/1993 | Upchurch | 423/34.4 |
| 5,302,200 | 4/1994 | Smetana et al. | 106/737 |

*Primary Examiner*—Michael Marcheschi
*Attorney, Agent, or Firm*—Bell, Seltzer, Park & Gibson, P.A.

[57] ABSTRACT

There is disclosed a cement plaster composition wherein an additive having from about 10% to about 75% of a silicone treated powder and from about 90% to about 25% of a pozzalanic filler is combined with a type I Portland cement and a crushed aggregate to form a water repellent coating for plastering a swimming pool surface. The additive may also include rheology modifiers, water reducing agents, or set time modifiers.

21 Claims, No Drawings

5,650,004

CEMENT PLASTER COMPOSITION, ADDITIVE THEREFOR AND METHOD OF USING THE COMPOSITION

BACKGROUND OF THE INVENTION

1. Field of the Invention

The present invention relates to an additive for cement compositions. More particularly, the present invention relates to an additive for Portland cement swimming pool plaster and to pool Portland cement plaster compositions containing the additive.

2. The Prior Art

Each year over 120,000 swimming pools are plastered. Many of these swimming pools are replaster jobs as a result of deterioration of the pool surfaces. Swimming pool plaster normally has a life expectancy of around 1 to 15 years depending on how it is taken care of chemically.

Swimming pool plaster is Portland cement blended with various types of crushed aggregate, and troweled to a smooth finish, normally ¼" to ¾" thickness. The plaster is generally acid sensitive resulting in etching, highlighting, aggressive nodules occurring on the plaster surface as a result of low water pH, low alkalinity, or aggressive water attacking the surface of the plaster.

Though deterioration of the plaster surface can occur at any age with an aggressive attack, highlighting or spot etching forms early in hydration when a susceptible cement allows penetration to the inner cement base surface. This type of etching is inversely proportional to the age of the plaster surface. After the first year, the plaster surface is much less susceptible to attack of aggressive water, e.g., than in the first month. A change in water chemistry from a stable to an aggressive is when a plaster surface can be permanently damaged. The longer a cement goes without an aggressive water attack, the less the damage when an aggressive water attack begins.

The pool plasters of the prior art absorb water. Water is a universal solvent. It creates both a corrosive and erosive environment for the pool plaster. The porous plaster surface absorbs surface stains that come from high calcium hardness which are difficult to remove. The weak points where the cement bonds to the aggregate are susceptible to aggressive water attack if the pH of the water in the pool falls too low. As a result, premature preferential etching of the surface can ruin a pool finish in less than a year by making it etched and highlighted.

In view of the problem of deterioration of the cement surfaces of swimming pools, it is desirable to provide an improvement in swimming pool cement plaster compositions which provides longevity of the plastered surface while continuously submerged under water, which typically has a low pH, and is very acidic and aggressive in nature, in relation to the surface of the cement plaster. Various attempts have been made to provide improved swimming pool cement plaster by modifying the plaster compositions. For example, acrylic polymers have been added to the cements to improve strength, durability and bonding. One such composition is disclosed in U.S. Pat. No. 4,430,463 to Mullenax but such additives require air-curing to reach full potential. Underwater cement curing and hydration is a must in the pool industry. Therefore silane-type materials become the ideal water repellency additive. For example, the prior art discloses a silicone treated lime product produced by Wacker Silicones, Adrian Michigan, which is used as an integral waterproofer for stucco. However, in the pool industry, additional lime in a plaster mix is not advisable. Lime is the product most likely to become soluble and to be leached.

It is therefore an object of the present invention to provide an improved cement pool plaster additive which extends the life of the plaster surface and thereby lowers the maintenance requirement of the plaster surface.

Another object of this invention is to provide a swimming pool cement plaster composition that can be cured underwater and which is virtually impervious to water during early stages of cement hydration.

Still another object of the present invention is to provide a process for coating the surface of a swimming pool with a cement plaster containing the additives of this invention.

These and other advantages of the present invention will become apparent to those skilled in the art from the following detailed description.

SUMMARY OF THE INVENTION

In accordance with the present invention, it has been found that a cement plaster composition containing from about 1.5% to about 3% by weight of an additive comprising from about 10% to about 75% of a silane coated powder, such as clay, and from about 90% to about 25% of a filler. Optionally, the additive contains from 0% to about 10% of a water reducing plasticizer. The additive produces a swimming pool plaster that will not absorb water and will maintain vapor permeability.

In a preferred embodiment, the additive contains from about 30% to about 60% of a clay coated with a silane in an amount of from about 10% to about 30% active silane, preferably about 12% to about 14% active silane. The additive also preferably contains from about 30% to 60% by weight of a filler. A preferred filler includes those selected from pozzolanic fillers, rheology fillers and silica fillers. The additive also preferably contains from about 5% to about 10% by weight of a water reducing plasticizer.

The cement plaster compositions of the present invention incorporate from about 20% to about 50% by weight of a type I Portland cement, from about 50% to about 80% by weight of aggregate, and from 1.5% to 3% by weight of the additive. The plaster compositions are coated onto the swimming pool base shotcrete or gunite shell or, in the case of replastering, the deteriorated old plaster.

It was found that cement plaster coatings using the additive of this invention produce a coating that is water repellent, with the ability to still breath and allow the cement to hydrate underwater. In addition, the cement plasters of this invention have been found to reduce preferential acid deterioration of the surface (spot etching), will not absorb stains, will not discolor because of contamination, and will reduce check cracking. The water repellency of the plaster coating means stains which do not penetrate are superficial, are not permanent and can be removed. Also, water repellency means efflorescence caused by the water flowing through the cement does not occur.

DESCRIPTION OF THE PREFERRED EMBODIMENTS

The cement composition of this invention is a material which may be generally termed a Portland cement coating composition particularly suitable for forming thin, durable, water repellent, acid resistant coatings on the surfaces of swimming pools. It has been found that an improved swimming pool cement plaster may be provided by a cement plaster composition having from about 20% to about 50% by weight of a Portland cement, from about 50% to about 80% by weight of aggregate, and from about 1.5% to about 3% by weight of an additive, which includes a silane treated powder and a filler.

The Portland cement is preferably a Type I cement and may be white, gray or pigmented. The amount of Portland cement present in the composition may vary depending upon numerous factors known to those skilled in the art but in any event will be between about 20% to about 50% by weight of the total composition. Preferably the amount of Portland cement in the plaster composition is between about 30% and about 40% by weight of the total composition.

Any of the aggregates normally used in cement pool plaster may be used in the compositions of this invention. The aggregate is present in the cement composition in an amount from about 50% to about 80% by weight based on the total weight of the composition, preferably in an amount from about 60% to about 70% by weight. The aggregate may include, for example, calcium carbonate, silica sand, quartz, or pebble stones. The aggregate is preferably crushed to a ¼" and smaller size.

The additive of the present invention is a combination of from about 10% to about 75%, preferably about 25% to about 75% silane coated powder, such as clay, and from about 90% to about 25%, preferably about 75% to about 25% by weight of the total additive of a filler. Optionally, the additive contains from 0% to about 10% of a water reducing plasticizer.

While a silane coated clay has been found to produce the desired results, it has been found preferable to include as part of the additive a chemically inert filler such as those selected from pozzolanic fillers, rheology fillers and silica fillers.

In a preferred embodiment, the additive contains from about 30% to about 60% of a clay coated with a silane in an amount of from about 10% to about 30% active silane, preferably about 12% to about 14% active silane. A preferred clay is metakaolin clay. While clays are preferred it should be understood that other powdered materials such as pozzolanic material, calcium hydroxide or lime are suitable so long as the material is capable of carrying the silane. The preferred silanes are silicones. Even more preferred is a silane selected from octyltriethoxysilane, isobutylsilane and dimethylsilicone. The silicone used in the additive of the present invention is a N-octyltriethoxysilane, selected for its long polymer chain and superior water repellency characteristics. The silane waterproofs and protects the cream layer (keeping it smooth and deterring bacteria growth) and also integrally waterproofs the entire ¼" plaster composite, protecting the cement and actually helping it hydrate without the adverse affects of the lower pH pool water.

The silanes used in the additive of this invention are insoluble compounds that do not require air to cure. The cement will continue to hydrate as it normally would under water. As noted, the silicone is introduced into the cement in a semi-dry state. By attaching the silicone to a silicate clay prior to introducing it into the cement, you rid the silicone through evaporation of much of its ethanol solvent. Therefore, only the active silicone polymer stays attached to the clay. This makes the silicone more compatible with the highly alkaline cement mixture.

The additive also preferably contains from about 30% to 60% by weight of a filler. The preferred fillers include those selected from pozzolanic fillers, and also include, for example, barium sulphate clay, ground silica, kaolin clay, bauxite, diatomaceous earth, bentonite, sepiolite and mixtures thereof. These products stem from the silicate family of organic raw materials, and minerals.

In addition, the preferred silica filler includes an inert powder such as finely ground silica, which is 99% $SiO_2$. $SiO^2$ reacts with the available Calcium hydroxide (lime) in the cement mixture to create a stronger more impervious plaster material. The lime is always the most soluble (most easily leached compound) and weakest link in the cement plaster composite. When the inert powder is included in the additive, it is normally ground to a particle size between #100 and #300 sieve size. This material is available from Uniman Corporation.

The additive also preferably contains from about 5% to about 10% by weight of a water reducing plasticizer. A preferred plasticizer is a melamine formaldehyde polymer. The melamine powder serves as a plasticizer. Plasticizers are used in cement application to improve flow, allow for smooth troweling, improve hydration of the plaster, and increase internal bond strength by reducing the amount of water required for workability and hydration. The plasticizer also promotes even distribution throughout the mixture reducing bleed water and segregation.

Of the ingredients that go into the additive, none are adversely affected by the fact that various types of aggregate are used in plaster, or by the fact that the plaster is immediately submerged underwater while it cures.

The plaster composition of the present invention is made by mixing the additive with cement in an amount from about 1.5% to about 3.0% to form a pool plaster useful as the pool's surface. It has been found that plaster compositions containing over about 3.0% of the additive over waterproofs the material and makes it difficult to finish. If the amount of additive in the plaster composition is below about 1.5% by weight, the water repellency is compromised.

The present invention includes a process for coating the surface of a swimming pool. A cement plaster composition comprising: from about 20% to about 50% by weight of a type I Portland cement; from about 50% to about 80% by weight of crushed aggregate; from about 1.5% to about 3% by weight of a pre-mixed additive comprising from about 25% to about 75% of a silicone treated clay; from about 75% to about 25% of a silica flour, from 5% to 10% of a water reducing agent; and the balance to 100% by weight water. The percent by weight based on the total weight of the composition is blended with water at the jobsite, in a portable cement mixer.

The cement plaster is hand placed, or sprayed over the existing concrete rough shell or in the case of a replaster, over a chipped out old plaster shell, or a bond coated or scratch coated shell. All surfaces will adhere, if surfaces are cleaned and prepared.

The plaster is hand troweled into place. The surface thickness typically ranges from ¼" to ¾". The surface is typically troweled three times in the process of getting the material placed properly and set properly. Upon completion of final troweling, the cement plaster composition is allowed to air dry and the pool is refilled with water to allow the material to hydrate underwater. Underwater cement hydration yields superior cement strengths, less check cracking, less chance of staining from contamination, and less chance of delamination.

Secondary benefits, in addition to the long term success of the cement in a harsh underwater environment, is that the additive of the present invention gives the plasterer good workability and improves the mix design and strength of the mixture. First, the plasticizer improves even aggregate distribution, which strengthens the plaster, because the cement is the binder to the aggregate. Consistency leaves fewer weak areas. Secondly, the use of ground silica improves the chemical reactions taking place in the cement, during its hydration process. Ground silica creates more calcium silicate compounds which reduce the calcium hydroxide compounds formed. Calcium silicate is a chemically inert compound, calcium hydroxide is not. Calcium hydroxide is highly soluble and easily leached out of unmodified plaster. Hence, weak areas are where greater amounts of calcium hydroxide are in the mixture.

The following examples are provided to further illustrate the present invention and are not to be construed as limiting the invention in any manner.

EXAMPLE 1

This example illustrates plaster compositions containing additives at various levels of addition. An additive for use in the Portland cement plasters of the present invention was made by admixing 250 pounds of a silane treated kaolin clay and 250 pounds of 300 mesh silica flour, and 27 pounds melamine powdered plasticizer together. A typical wet mix cement composition was made by incorporating 94 pounds of Portland cement (white) type I, 200 pounds of calcium carbonate and varying amounts of additive with the remainder being water, as shown in the table below. The cement composition was hand troweled onto the deteriorated surface of a swimming pool in a thickness of about ¼". Moisture permeability tests concluded there was no penetration of water when the pool was refilled, if the silicone content remained at a certain level. In addition, there were no signs of spot etching on the surface of the plaster with at least 1.5% of the total additive, after 60 days submerged in an aggressive water chemistry situation, pH 6.8 to 7.2.

| Percent of Additive | Water Absorption | Spot Etching | Workability |
| --- | --- | --- | --- |
| 0.25 | yes | severe | good |
| 0.50 | yes | moderate | good |
| 1.00 | yes | slight | good |
| 1.50 | yes | none | good |
| 2.00 | no | none | excellent |
| 2.50 | no | none | excellent |
| 3.00 | no | none | poor |

EXAMPLE 2

An additive for use in the Portland cement plasters of the present invention was made by admixing 250 pounds of a silicone treated clay and 250 pounds of a silica flour together and 27 pounds of melamine formaldehyde powder. A typical wet mix cement composition was made by incorporating 94 pounds of Portland cement (white) type I, 200 pounds of calcium carbonate and 7.5 pounds of additive with the remainder being water. The cement composition was hand troweled onto the deteriorated surface of a swimming pool in a thickness of about ½". Moisture permeability tests concluded there was no penetration of water when the pool was refilled. In addition, there were no signs of etching the surface.

While preferred embodiments of the present invention have been disclosed, it will be appreciated that the present invention is not limited thereto but may be otherwise embodied with the scope of the following claims.

That which is claimed is:

1. A cement plaster composition comprising:
   (a) from about 20% to about 50% by weight of a Portland cement;
   (b) from about 50% to about 80% by weight of aggregate;
   (c) from about 1.5% to about 3% by weight of an additive comprising from about 10% to about 75% by weight of said additive of a silane treated powder, from about 90% to about 25% by weight of said additive of a material comprising barium sulphate clay, ground silica, kaolin clay, bauxite, diatomaceous earth, bentonite, sepiolite or mixtures thereof, and from 0% to about 10% by weight of said additive is a water reducing plasticizer; and
   (d) the balance water.

2. The cement plaster composition according to claim 1 wherein said Portland cement is a type I Portland cement and is present in an amount from 30% to of the total composition.

3. The cement plaster composition according to claim 1 wherein said aggregate is from 60% to 70% of the total composition.

4. The cement plaster composition according to claim 1 wherein said silane treated power, is a kaolin clay, coated with a liquid silicone.

5. The cement plaster composition according to claim 1 wherein said silane treated powder is a powder of pozzolanic material coated with a liquid silicone.

6. The cement plaster composition according to claim 1 wherein said silane treated powder is a calcium hydroxide or lime particle coated with silane or silicone water repellency fluid.

7. The cement plaster composition according to claim 1 wherein said silane is selected from the group consisting of n-octyltriethoxysilane, isobutylsilane and dimethylsilicone.

8. The cement plaster composition according to claim 1 wherein said silane treated powder contains between 10% and 30% active silane.

9. The cement plaster composition according to claim 1 wherein said silane treated powder contains between 12% and 14% active silane.

10. The cement plaster composition according to claim 1 wherein said water reducing plasticizer is a melamine formaldehyde polymer.

11. A cement plaster composition comprising:
    (a) from about 30% to about 40% by weight of a Portland cement;
    (b) from about 60% to about 70% by weight of aggregate;
    (c) from about 1.5% to about 3% by weight of an additive comprising from about 25% to about 75% by weight of said additive of a silane coated kaolin clay, said coated clay having between 10% and 30% active silane; from about 75% to about 25% by weight of said additive of a material comprising barium sulphate clay, ground silica, kaolin clay, bauxite, diatomaceous earth, bentonite, sepiolite or mixtures thereof, and from 5% to about 10% by weight of said additive is a melamine formaldehyde polymer; and
    (d) the balance water.

12. A cement plaster additive comprising: from about 25% to about 75% by weight of a silane treated powder; from about 75% to 25% of a material comprising a barium sulphate clay, ground silica, kaolin clay, bauxite, diatomaceous earth, bentonite, sepiolite or mixtures thereof; and from 0% to about 10% by weight of said additive of a water reducing plasticizer.

13. The cement plaster additive according to claim 12 wherein said silane treated powder is a metakaolin particle coated with silicone.

14. The cement plaster additive according to claim 12 wherein said silane treated powder is a powder of pozzolanic material coated with a liquid silicone.

15. The cement plaster additive according to claim 12 wherein said silane treated powder is a calcium hydroxide or lime particle coated with silane or silicone water repellency fluid.

16. The cement plaster additive according to claim 12 wherein said silane is selected from the group consisting of n-octyltriethoxysilane, isobutylsilane and dimethylsilicone.

17. The cement plaster additive according to claim 12 wherein said silane treated powder contains between 10% and 30% active silane.

18. The cement plaster additive according to claim 12 wherein said silane treated powder contains between 12% and 14% active silane.

19. The cement plaster additive according to claim 12 wherein said water reducing plasticizer is a melamine formaldehyde polymer.

20. A process for coating a surface of a swimming pool comprising: applying to said pool surface a cement plaster composition comprising: from about 20% to about 50% by weight of a type I Portland cement; from about 50% to about 80% by weight of crushed aggregate; from about 1.5% to about 3.0% by weight of an additive comprising from about 10% to about 75% by weight of said additive of a silane treated powder; from about 90% to about 25% by weight of said additive of a material comprising barium sulphate clay, ground silia, kaolin clay, bauxite, diatomaceous earth, bentonite, sepiolite or mixtures thereof, and from 0% to about 10% by weight of said additive of a water reducing plasticizer; and the balance water.

21. The cement plaster additive according to claim 12 wherein said silane treated powder is kaolin coated with silicone.

* * * * *

UNITED STATES PATENT AND TRADEMARK OFFICE
CERTIFICATE OF CORRECTION

PATENT NO. : 5,650,004
DATED : July 22, 1997
INVENTOR(S) : Yon

It is certified that error appears in the above-identified patent and that said Letters Patent is hereby corrected as shown below:

On the title page, column 2, Abstract, line 4, "pozzalanic" should be --pozzolanic--.

Column 3, line 25, after "75%" insert a space.

Column 3, line 40, after "preferred" insert a comma (,).

Column 4, line 44, after "flour" the comma (,) should be a semicolon (;).

Column 6, line 18, after "to" insert --40%--.

Signed and Sealed this

Twenty-first Day of April, 1998

Attest:

BRUCE LEHMAN

Attesting Officer    Commissioner of Patents and Trademarks